United States Patent [19]

Stancil

[11] Patent Number: 5,862,619
[45] Date of Patent: Jan. 26, 1999

[54] ANIMATED WATER FOWL DECOY

[76] Inventor: Jeffrey T. Stancil, 932 Wilmington St., Redwood City, Calif. 94062

[21] Appl. No.: 753,516

[22] Filed: Nov. 26, 1996

[51] Int. Cl.[6] .................................................. A01M 31/06
[52] U.S. Cl. ......................................................... 43/3; 43/2
[58] Field of Search ................................................ 43/2, 3

[56] References Cited

U.S. PATENT DOCUMENTS

| | | | |
|---|---|---|---|
| 146,334 | 1/1874 | Hagstrom | 446/217 |
| 183,550 | 10/1876 | Earle | 446/244 |
| 838,305 | 12/1906 | Curial | 446/243 |
| 1,393,148 | 10/1921 | McQuarrie | 446/244 |
| 1,401,813 | 12/1921 | Popper | 446/244 |
| 2,154,031 | 4/1939 | Bunting | 446/217 |
| 2,413,418 | 12/1946 | Rulison | 43/3 |
| 2,485,053 | 10/1949 | Layfield | 43/42.13 |
| 2,516,367 | 7/1950 | Cloud | 446/244 |
| 2,527,109 | 10/1950 | Vasquez | 446/243 |
| 2,542,622 | 2/1951 | Bordner | 43/42.12 |
| 2,545,801 | 3/1951 | Wrazen | 446/199 |
| 2,692,451 | 10/1954 | Deuster | 43/3 |
| 2,711,613 | 6/1955 | Brown | 446/199 |
| 2,797,510 | 7/1957 | McLarty | 446/217 |
| 2,904,922 | 9/1959 | Orebaugh | 446/243 |
| 3,128,569 | 4/1964 | Eberhart | 446/243 |
| 3,204,964 | 9/1965 | Geary | 446/243 |
| 3,272,506 | 9/1966 | Lescher | 446/243 |
| 3,564,760 | 2/1971 | McGannon | 446/243 |
| 3,624,958 | 12/1971 | Salayka | 446/243 |
| 3,721,037 | 3/1973 | Allen | 446/244 |
| 4,128,958 | 12/1978 | Snow | 43/3 |
| 4,620,385 | 11/1986 | Carranza et al. | 43/3 |
| 4,845,873 | 7/1989 | Hazlett | 43/3 |
| 4,896,448 | 1/1990 | Jackson | 43/3 |
| 4,972,620 | 11/1990 | Boler | 43/3 |
| 4,990,091 | 2/1991 | Mir-Heidari | 446/243 |
| 5,065,621 | 11/1991 | Holder | 40/440 |
| 5,085,075 | 2/1992 | Baker | 73/188 |
| 5,191,730 | 3/1993 | Balmer | 43/3 |
| 5,196,961 | 3/1993 | Sun | 40/479 |
| 5,231,780 | 8/1993 | Gazalski | 43/3 |
| 5,551,923 | 9/1996 | Worzella | 472/137 |

*Primary Examiner*—Michael J. Carone
*Assistant Examiner*—Darren Ark
*Attorney, Agent, or Firm*—James D. Ivey

[57] ABSTRACT

The appearance of symmetrical lateral movement such as the flapping of a bird's wings is provided by a rotating vane which has a light side and a dark side. The vane is generally elliptical in shape and is divided into two blades. Each of the blades is curled about an axis which is generally parallel to the axis of rotation of the vane. Accordingly, rotation of the vane alternately shows the light and dark sides of the vane such that the light side of the vane appears from a distance to be moving along the axis of rotation about the center of the axis of rotation. The vane is rotatably attached to an animal decoy, such as a duck decoy, by a support. The curvature of the vane causes the vane to rotate in response to a wind force. During rotation, the top of the vane moves away from the head of the decoy and the bottom of the vane moves toward the head such that any lift generated by rotation of the vane is directed upwards to lift the decoy slightly out of the water rather than drive the decoy into the water. A motor can supply rotational force to the vane in the absence of wind force.

16 Claims, 7 Drawing Sheets

ANIMATED WATER FOWL DECOY

FIELD OF THE INVENTION

The present invention relates to hunting decoys and, in particular, to an animated water fowl decoy whose motion is particularly efficient at attracting water fowl.

BACKGROUND OF THE INVENTION

Water fowl decoys which are made to resemble various water fowl such as ducks or geese have long been used by hunters to attract game to a particular area. Such decoys are generally made of wood or molded plastic and are placed in water to mimic the appearance of a flock of ducks or geese sitting in a lake, lagoon, cove, or other similar body of water. Since the decoys are motionless, such decoys are not particularly visible from the altitudes at which water fowl fly and therefore have limited success in attracting game.

Accordingly, a number of attempts have been made to introduce motion to water fowl decoys. Some conventional decoys are dragged by underwater systems to give the decoys the appearance of swimming about in the water. However, such conventional decoy systems have only limited success, apparently since the swimming motion is hardly perceptible to water fowl flying overhead at significant altitudes. Other conventional decoys employ elaborate mechanically driven wings to imitate the flapping of wings by a bird. Such flapping decoys are better at attracting game but suffer from the disadvantages of mechanical complexity and associated expense.

What is needed is a particularly simple and inexpensive mechanism by which motion resembling the flapping of a bird's wings is introduced to a bird decoy.

SUMMARY OF THE INVENTION

In accordance with the present invention, the appearance of symmetrical lateral movement such as the flapping of a bird's wings is provided by a rotating vane which has a light side and a dark side. The vane is generally elliptical in shape and is divided into two blades. Each of the blades is curled about an axis which is generally parallel to the axis of rotation of the vane. Accordingly, rotation of the vane alternately shows the light and dark sides of the vane such that the light side of the vane appears from a distance to be moving along the axis of rotation about the center of the axis of rotation.

The vane is rotatably attached to an animal decoy, which is a duck decoy in one embodiment, by a support. The curvature of the vane causes the vane to rotate in response to a wind force. During rotation, the top of the vane moves away from the head of the decoy and the bottom of the vane moves toward the head such that any lift generated by rotation of the vane is directed upwards to lift the decoy slightly out of the water rather than drive the decoy into the water. A motor can supply rotational force to the vane in the absence of wind force.

The vane and support collectively form a motion lure which, in accordance with the present invention, has but one moving part. Accordingly, the present invention represents a significant reduction in the complexity and expense of prior art decoys with flapping wing mechanisms. In addition, the motion lure according to the present invention is as effective, or more effective, in attracting game from the air.

DETAILED DESCRIPTION

In accordance with the present invention, a rotating vane 100 (FIG. 1) is attached to a bird decoy 10 to resemble, when viewed from a relatively high altitude, flapping of a bird's wings. Vane 100 has a light side 102W and a dark side 102B such that rotation of vane 100 gives a light and dark flashing appearance. As described more completely below, the shape of vane 100, when rotating, gives the appearance of symmetrical horizontal movement consistent with the flapping of a birds wings.

Figure 1:
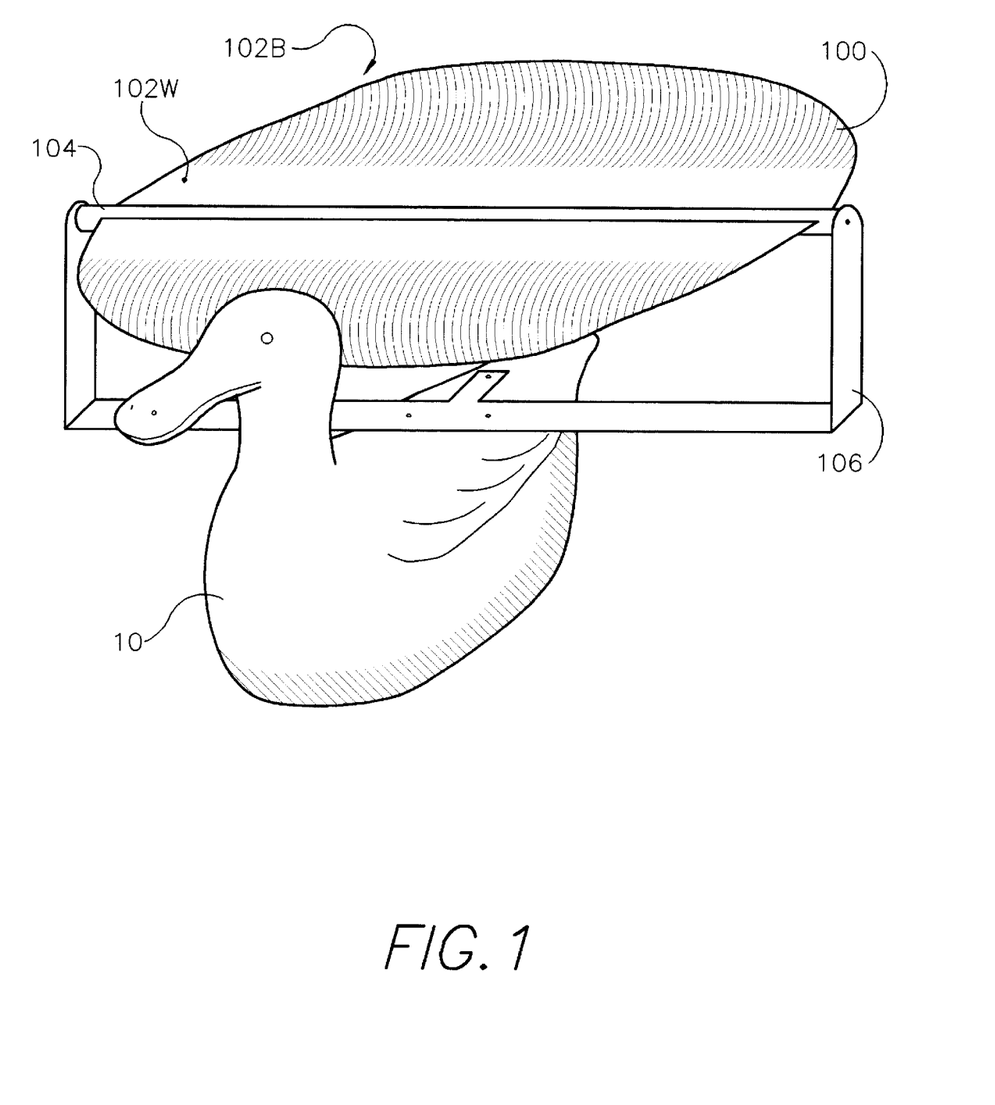
FIG. 1 is a perspective view of a duck decoy with a motion lure according to the present invention.
Figure 2:
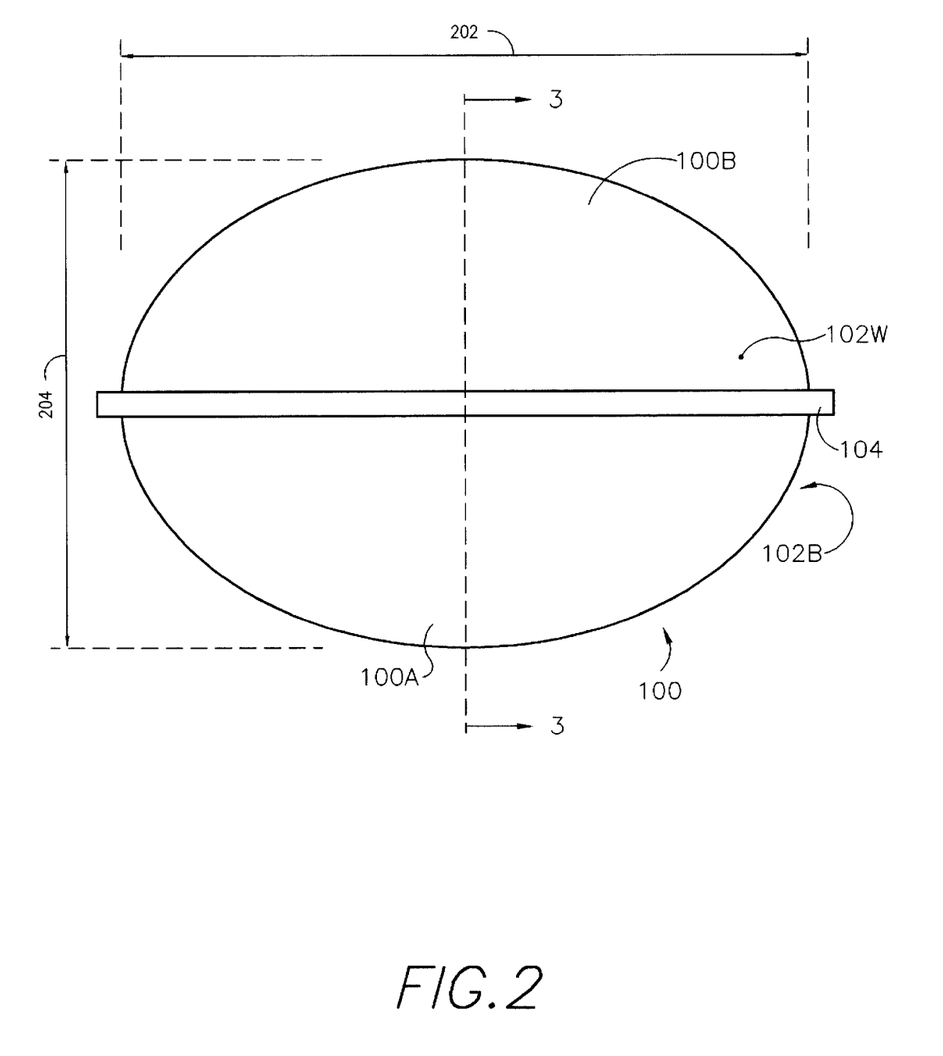
FIG. 2 is a plan view of a vane of the motion lure of FIG. 1.

Vane 100 includes a spindle 104 about which vane 100 rotates. Spindle 104 is rotatably mounted at either end to a support 106 which is in turn mounted to decoy 10. Vane 100 is shown in plan view in FIG. 2 and in cross section view in FIG. 3. Vane 100 has a width 202 and a height 204 which are, in one embodiment, approximately fifteen (15) inches and approximately ten (10) inches, respectively. Vane 100 has a generally elliptical shape and is symmetrically positioned through spindle 104. Light side 102W of vane 100 has a relatively light color and is white in one embodiment. Dark side 102B of vane 100 has a relatively dark color and is black in one embodiment. In one embodiment, vane 100 is cut from a sheet of aluminum whose thickness is 0.03125 inches. Spindle 104 is, in one embodiment, a wooden dowel whose diameter is approximately 0.75 inches and whose length is approximately seventeen (17) inches. In an alternative embodiment, vane 100 and spindle 104 are formed as a unitary piece of plastic by a conventional injection molding process.

Figure 3:
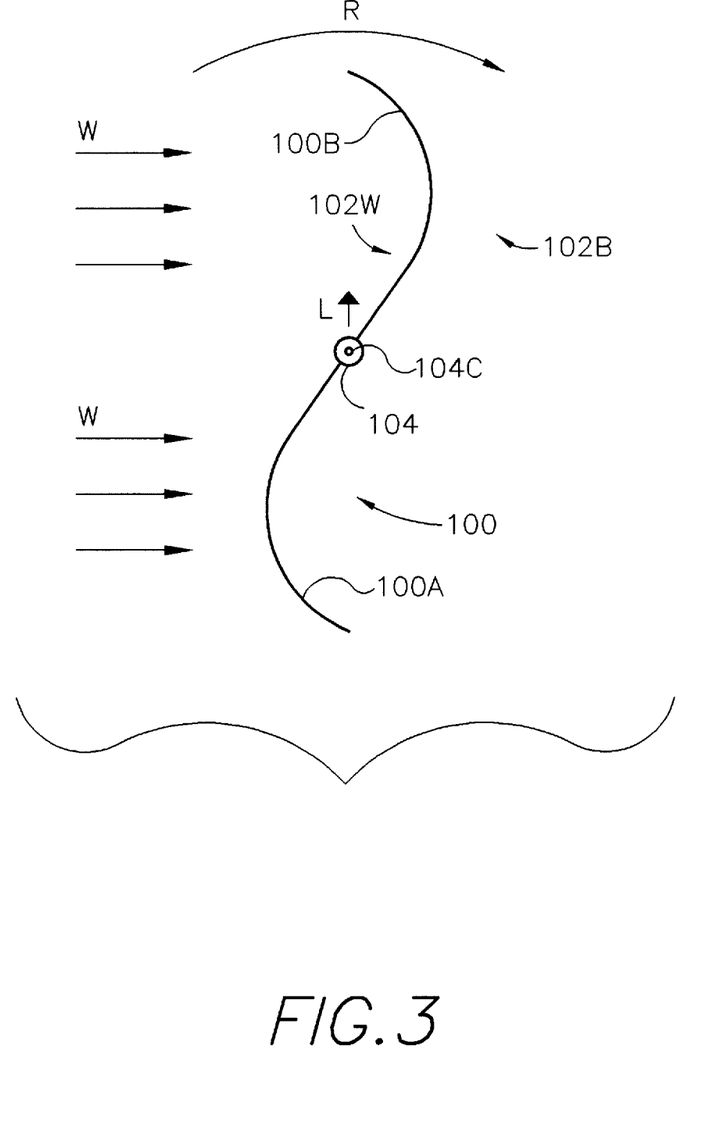
FIG. 3 is a cross section view of the vane of FIG. 2.

Vane 100 has blades 100A and 100B which are mutually symmetrical about spindle 104. As shown in FIG. 3, each of blades 100A and 100B is curled along an axis generally parallel to spindle 104 such that vane 100 has a general "S" shape in cross section view. Wind in the direction of arrows W causes rotation of vane 100 in the direction of arrow R. It is preferred that vane 100 and spindle 104 are as perfectly balanced about center of rotation 104C as possible. Any imbalance about center of rotation 104 increases the amount of wind which is required to cause rotation of vane 100. It has been found that even slight breezes can generate acceptable rotation of vane 100 when imbalance about center of rotation 104 is minimized.

Rotation of vane 100 in the direction of arrow R generates lift in the direction of arrow L. When placed on a floating decoy 10 (FIG. 1), it is preferred that the lift generated by rotation of vane 100 is directed upward to lift decoy 10 out of the water slightly. If lift generated by rotation of vane 100 is directed downward, such lift tends to push decoy 10 into the water. Therefore, decoy 10 is typically tethered at the head end of decoy 10 to an anchor such that wind comes from the head end of decoy 10, and rotation of vane 100 involves movement of the upper portion of vane 100 with the direction of wind and away from the head end and movement of the lower portion of vane 100 against the direction of wind and toward the head end.

As described briefly above, rotation of vane 100 gives the appearance of symmetrical horizontal movement which resembles the flapping of a bird's wings when viewed from above at a substantial distance. Vane 100 is shown in various sequential rotational positions in FIGS. 4A–H to illustrate the visual appearance of vane 100 during rotation.

Figure 4A:
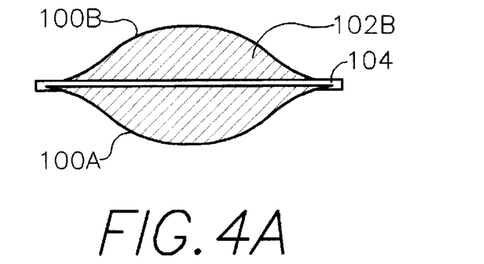
FIGS. 4A–4H are sequential views of the vane of FIGS. 2 and 3 during rotation of the vane of FIGS. 2 and 3.
Figure 4B:
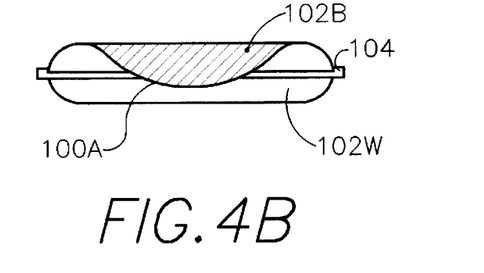

FIG. 4A shows vane 100 with portions of vane 100 near spindle 104 nearly horizontal. Blade 100A is curled downward and blade 100B is curled upward such that dark side 102B is visible on both blades 100A and 100B. In FIG. 4B, blade 100A is slight higher as a result of one-eighth of a turn of vane 100. A portion of dark side 102B is still visible on the downward-curled portion of blade 100A, but the visible portion of dark side 102B is concentrated near the center of spindle 104. Meanwhile, light side 102W of both blades 100A and 100B is becoming visible, and the visible portion of light side 102W is concentrated near either end of spindle 104.

Figure 4C:
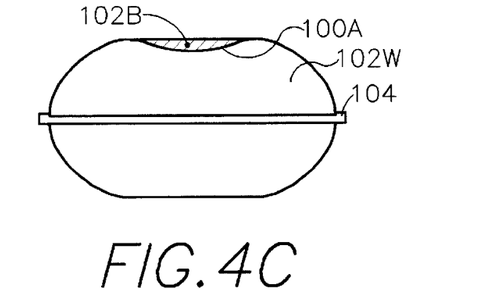
Figure 4D:
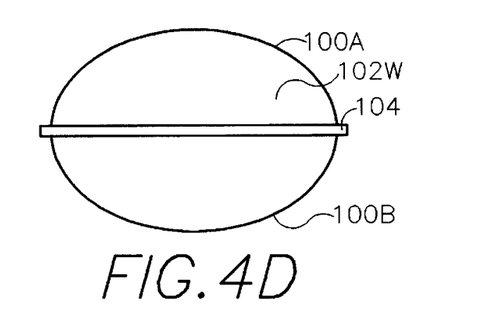
Figure 4E:
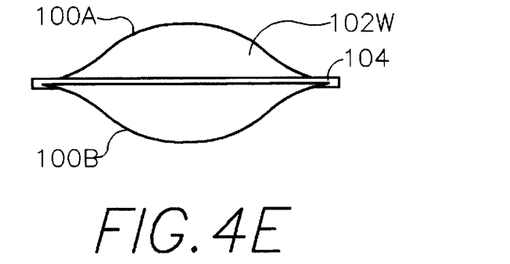

In FIG. 4C, blade 100A is approaching a vertical position, and dark side 102B is barely visible at a position generally aligned with the center of spindle 104. Light side 102W is clearly visible on both blades 100A and 100B. In FIG. 4D, blades 100A and 100B are substantially vertical and dark side 102B is not visible at all; only light side 102W is visible. From the successive views shown in FIGS. 4B–4D, light side 102W appears to move from the outer edges of spindle 104 to fill the entirety of vane 100.

Figure 4F:
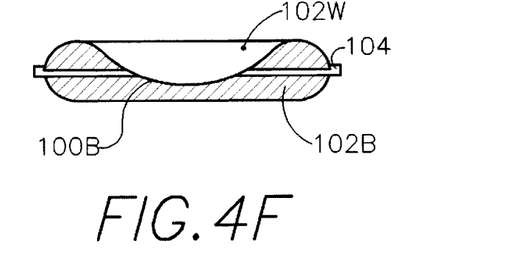

FIG. 4E shows vane 100 again with portions of vane 100 near spindle 104 nearly horizontal. However, in contrast to FIG. 4A, blade 100B is curled downward and blade 100A is curled upward such that light side 102W is visible on both blades 100A and 100B in FIG. 4E. As shown, the light color of light side 102W appears to be concentrated near the center of spindle 104. In movement from the position shown in FIG. 4D to the position shown in FIG. 4E, light side 102W appears to move from the entire length of spindle 104 toward the center of spindle 104. In FIG. 4F, blade 100B is slight higher as a result of one-eighth of a turn of vane 100. A portion of light side 102W is still visible on the downward-curled portion of blade 100B, and the visible portion of light side 102W is still concentrated near the center of spindle 104. Meanwhile, dark side 102B of both blades 100A and 100B is becoming visible, and the visible portion of dark side 102B is concentrated near either end of spindle 104.

Figure 4G:
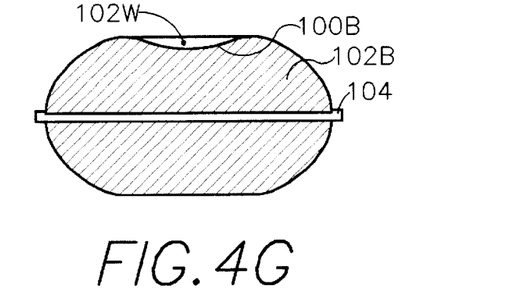
Figure 4H:
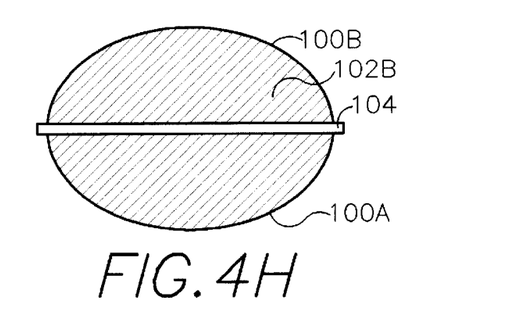

In FIG. 4G, blade 100B is approaching a vertical position, and light side 102W is barely visible at a position generally aligned with the center of spindle 104. Dark side 102B is clearly visible on both blades 100A and 100B. In FIG. 4H, blades 100A and 100B are substantially vertical and light side 102W is not visible at all; only dark side 102B is visible. From the sequence of views shown in FIGS. 4E–H, light side 102W appears to move toward and vanish near the center of spindle 104.

During rotation of vane 100, the views shown in FIGS. 4A–H repeatedly appear in rapid succession. Light side 102W seems to repeatedly (i) appear at either end of spindle 104 (FIGS. 4A and 4B), (ii) move toward the center of spindle 104 (FIGS. 4C and 4D), and (iii) disappear near the center of spindle 104 (FIGS. 4E–4H). Thus, rotation of vane 100 gives the appearance of lateral, symmetrical motion. Such motion resembles the flapping of a bird's wings when viewed from a distance, e.g., several hundred feet.

Figure 5:
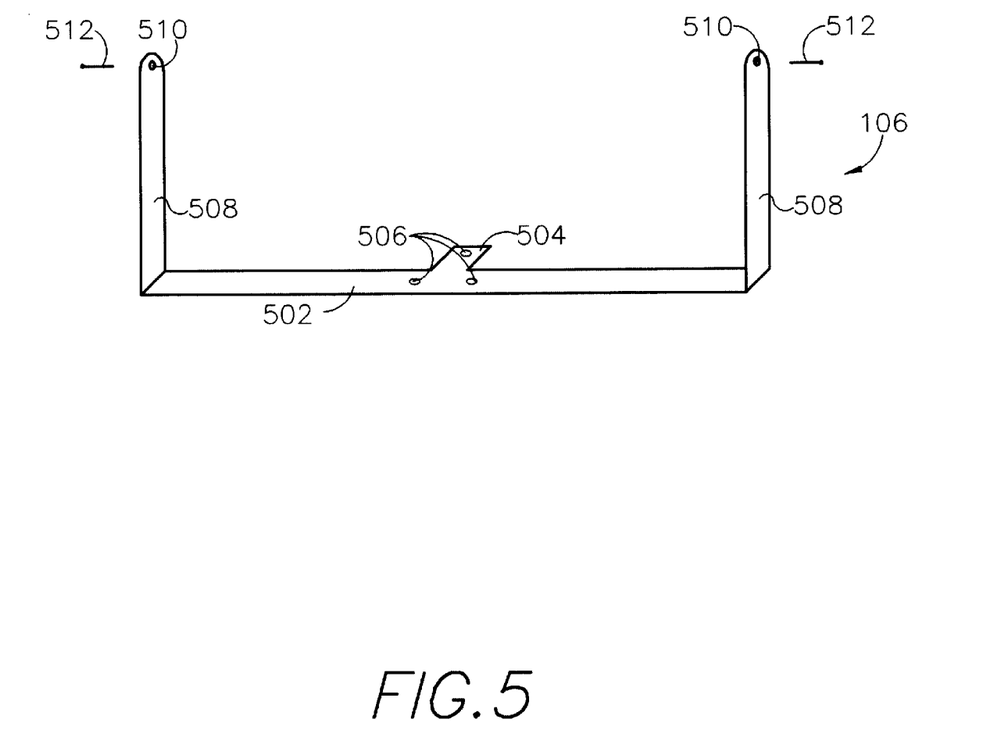
FIG. 5 is a perspective view of the support of the motion lure of FIG. 1.

As described above, vane 100 (FIG. 1) is rotatably mounted to support 106 which is in turn mounted to decoy 10. Support 106 is shown in isolation in FIG. 5. Support 106 includes a base 502 and a support member 504 for added stability which is particularly important when vane 100 (FIG. 1) is subjected to relatively strong winds. Holes 506 (FIG. 5) are included in base 502 and support member 504 such that support 106 can be attached to decoy 10 (FIG. 1) by screws or similar attaching members. Support 106 (FIG. 5) includes posts 508 which are attached at either end to base 502. Each post 508 includes a hole 510 through which an axle is attached to spindle 104 (FIG. 3) at center of rotation 104C. Holes 510 (FIG. 5) are spaced from base 502 by a distance which is at least one-half of height 204 (FIG. 2) of vane 100. Support 106 (FIG. 5) can be cut from a sheet of aluminum and bent into the shape shown in FIG. 5 or can be formed of plastic using a conventional injection molding process.

Figure 6:
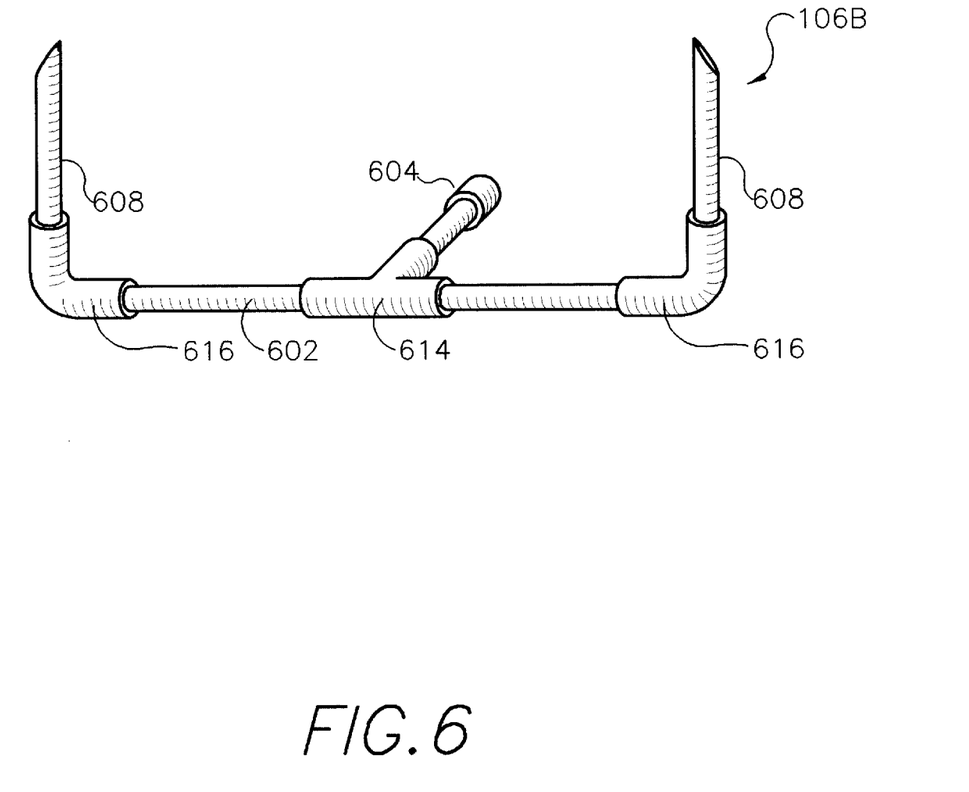
FIG. 6 is a perspective view of an alternative embodiment of the support of the motion lure of FIG. 1.

Support 106B (FIG. 6), which is an alternative embodiment of support 106 (FIG. 5), is made of pipe, e.g., PVC pipe. Support member 604 (FIG. 6) is attached to base 602 by a "T" section 614, and posts 608 are attached to base 602 by respective elbow sections 616.

Figure 7:
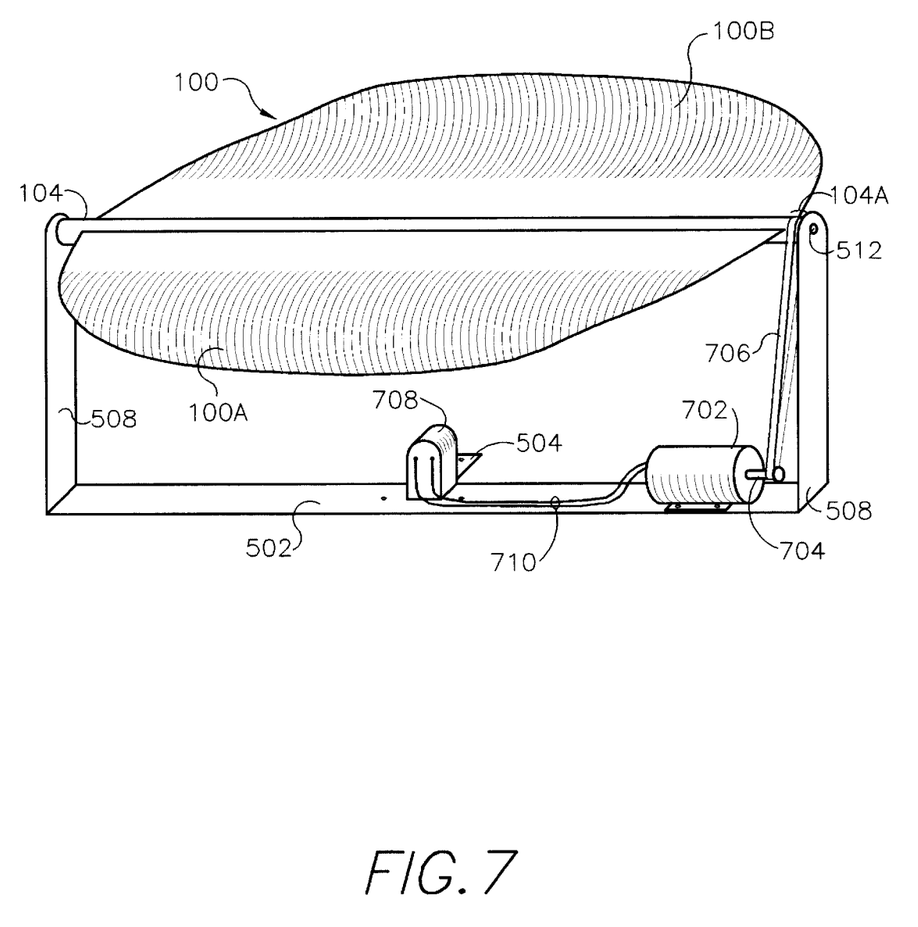
FIG. 7 is a perspective view of a motion lure in which rotation of the vane is caused by a motor.

Sometimes, insufficient wind is present to cause rotation of vane 100 (FIG. 1). In an alternative embodiment shown in FIG. 7, rotation of vane 100 is caused by a motor 702. Motor 702 is attached to base 502 and turns a motor spindle 704. A band 706 stretches around motor spindle 704 and spindle 104 and transfers the rotational force of motor spindle 704 to spindle 104 to thereby drive vane 100 to rotate. A portion 104A of spindle 104 extends beyond blades 100A and 100B to allow space for band 704 on spindle 104. A battery case 708 holds a battery (not shown) which supplies electrical power to motor 702 through wires 710.

The above description is illustrative only and is not limiting. For example, while it is described that vane 100 (FIG. 1) is generally elliptical in shape and has two blades 100A and 100B, it is appreciated that vane 100 can have any of a number of varying shapes and still produce a motion which attracts game. In addition, blades 100A and 100B can be integral parts of a unitary vane 100 which is inserted through a slot (not shown) in spindle 104. Furthermore, while vane 100 is shown to rotate about an axis of rotation which is substantially horizontal, it is appreciated that other orientations of rotation of vane 100 can produce acceptable results. It is also appreciated that support 106 and vane 100 can be deployed in the absence of decoy 10. For example, support 106 and vane 100 can be deployed in an area near decoys such as decoy 10 or can be used alone to attract game. Accordingly, the present invention is defined solely by the claims which follow and their full range of equivalents.

What is claimed is:

1. A motion lure usable with an animal decoy, the motion lure comprising:
   a support which can be attached to the animal decoy; and
   one or more attachments which are movably attached to the support and each of which includes:
   a first portion and a second portion, which is in visual contrast with the first portion, such that rotation of the one or more attachments about an axis of rotation relative to the support makes the first and second portions alternately visible from a particular viewing perspective, which is generally displaced from and along a line which is perpendicular to the axis of rotation, in such a manner that gives the appearance of motion in a direction which is parallel to the axis of rotation.

2. A motion lure usable with an animal decoy, the motion lure comprising:

a support which can be attached to the animal decoy; and one or more attachments which are movably attached to the support and each of which includes:

a light portion and a dark portion such that rotation of the one or more attachments about an axis of rotation relative to the support gives the appearance of movement of the light portion along the axis of rotation when viewed from a particular viewing perspective which is generally displaced from and along a line which is perpendicular to the axis of rotation.

3. The motion lure of claim 2 wherein the appearance of movement of the light portion is symmetrical about a center of the axis of rotation.

4. A motion lure usable with an animal decoy, the motion lure comprising:

a support which can be attached to the animal decoy; and one or more attachments which are movably attached to the support and each of which includes:

a light portion and a dark portion such that rotation of the one or more attachments about an axis of rotation relative to the support makes the light and dark portions alternately visible from a particular viewing perspective, which is generally displaced from and along a line which is perpendicular to the axis of rotation, in such a manner that gives the appearance of motion in a direction which is parallel to the axis of rotation.

5. The motion lure of claim 4 wherein the axis of rotation is horizontal.

6. The motion lure of claim 4 wherein at least one of the one or more attachments is curled about an axis substantially parallel to the axis of rotation.

7. The motion lure of claim 4 wherein the one or more attachments are exactly two in number and collectively form a vane.

8. The motion lure of claim 7 wherein the light portions of the one or more attachments are on a side of the vane and the dark portions of the one or more attachments are on an opposing side of the vane.

9. The motion lure of claim 7 wherein the vane has an elliptical shape.

10. The motion lure of claim 7 wherein each of the one or more attachments is curled such that the vane generally has an "S" shape in cross section.

11. The motion lure of claim 4 wherein the one or more attachments rotate about the axis of rotation in response to a wind force.

12. The motion lure of claim 4 further comprising:

a motor which is capable of generating a rotational force; and a drive mechanism which is coupled between the motor and the one or more attachments and which transfers the rotational force from the motor to the one or more attachments causing rotation of the one or more attachments about the axis of rotation.

13. An animal decoy comprising:

(a) a body resembling an animal; and (b) a motion lure attached to the body, the motion lure including:

(i) a support attached to the body; and (ii) one or more attachments which are movably attached to the support and each of which includes:

(1) a light portion and a dark portion such that rotation of the one or more attachments about an axis of rotation relative to the support makes the light and dark portions alternately visible from a particular viewing perspective, which is generally displaced from and along a line which is perpendicular to the axis of rotation, in such a manner that gives the appearance of motion in a direction which is parallel to the axis of rotation.

14. The animal decoy of claim 13 wherein the animal is a water fowl.

15. The animal decoy of claim 13 wherein the one or more attachments rotate in such a way that any lift generated by such rotation tends to raise the body.

16. The animal decoy of claim 15 wherein the body has a head end;

further wherein the axis of rotation is substantially horizontal; and further wherein the one or more attachments rotate such that the one or more attachments move away from the head end when passing over the axis of rotation and move toward the head end when passing under the axis of rotation.

* * * * *